United States Patent
Borgstrom

(10) Patent No.: US 9,520,138 B2
(45) Date of Patent: Dec. 13, 2016

(54) ADAPTIVE MODULATION FILTERING FOR SPECTRAL FEATURE ENHANCEMENT

(71) Applicant: Broadcom Corporation, Irvine, CA (US)

(72) Inventor: Bengt J. Borgstrom, Santa Monica, CA (US)

(73) Assignee: Broadcom Corporation, Irvine, CA (US)

( * ) Notice: Subject to any disclaimer, the term of this patent is extended or adjusted under 35 U.S.C. 154(b) by 175 days.

(21) Appl. No.: 14/210,036

(22) Filed: Mar. 13, 2014

(65) Prior Publication Data

US 2014/0270226 A1     Sep. 18, 2014

Related U.S. Application Data

(60) Provisional application No. 61/793,324, filed on Mar. 15, 2013, provisional application No. 61/945,544, filed on Feb. 27, 2014.

(51) Int. Cl.
*H03B 29/00* (2006.01)
*G10K 11/16* (2006.01)
(Continued)

(52) U.S. Cl.
CPC ........... *G10L 21/0208* (2013.01); *G10L 17/00* (2013.01); *G10L 25/06* (2013.01); *G10L 17/04* (2013.01)

(58) Field of Classification Search
None
See application file for complete search history.

(56) References Cited

U.S. PATENT DOCUMENTS

| | | | |
|---|---|---|---|
| 2007/0192100 A1* | 8/2007 | Rosec | G10L 21/00 704/246 |
| 2009/0228272 A1* | 9/2009 | Herbig | G10L 25/78 704/233 |
| 2011/0300806 A1* | 12/2011 | Lindahl | G10L 21/0208 455/63.1 |

OTHER PUBLICATIONS

Borgstrom, et al., "Linear Prediction Modulation Filtering for Speaker Recognition of Reverberant Speech", Odyssey 2012, The Speaker and Language Recognition Workshop, Singapore, Jun. 25-28, 2012, 7 pages.

(Continued)

*Primary Examiner* — Muhammad N Edun
(74) *Attorney, Agent, or Firm* — Fiala & Weaver P.L.L.C.

(57) ABSTRACT

Techniques described herein are directed to the enhancement of spectral features of an audio signal via adaptive modulation filtering. The adaptive modulation filtering process is based on observed modulation envelope autocorrelation coefficients obtained from the audio signal. The modulation envelope autocorrelation coefficients are used to determine parameters of an adaptive filter configured to filter the spectral features of the audio signal to provide filtered spectral features. The parameters are updated based on the observed modulation envelope autocorrelation coefficients to adapt to changing acoustic conditions, such as signal-to-noise ratio (SNR) or reverberation time. Accordingly, such acoustic conditions are not required to be estimated explicitly. Techniques described herein also allow for the estimation of useful side information, e.g., signal-to-noise ratios, based on the observed spectral features of the audio signal and the filtered spectral features, which can be used to improve speaker identification algorithms and/or other audio processing algorithms.

20 Claims, 7 Drawing Sheets

(51) Int. Cl.
*G10L 21/0208* (2013.01)
*G10L 17/00* (2013.01)
*G10L 25/06* (2013.01)
*G10L 17/04* (2013.01)

(56) References Cited

OTHER PUBLICATIONS

Borgstrom, et al., "The Linear Prediction Inverse Modulation Transfer Function (LP-IMTF) Filter for Spectral Enhancement, With Applications to Speaker Recognition", IEEE International Conference on Acoustics, Speech and Signal Processing (ICASSP), Kyoto, Japan, Mar. 25-30, 2012, 4 pages.

* cited by examiner

ADAPTIVE MODULATION FILTERING FOR SPECTRAL FEATURE ENHANCEMENT

CROSS REFERENCE TO RELATED APPLICATIONS

This application claims priority to U.S. Provisional Application Ser. No. 61/793,324, filed Mar. 15, 2013, and U.S. Provisional Application Ser. No. 61/945,544, filed Feb. 27, 2014, which are incorporated by reference herein in their entirety.

BACKGROUND

Technical Field

The subject matter described herein relates to audio processing applications.

Description of Related Art

Many audio processing applications (e.g., speech processing algorithms) require robustness to acoustic distortion or communication channel effects. Such applications include, but are not limited to, automatic speaker identification (SID) and automatic speech recognition (ASR). Furthermore, many audio processing applications, including SID and ASR, are complex in nature and thus not suitable for portable devices.

There exist various methods for feature enhancement in automated audio applications. The most common methods, such as spectral subtraction, aim to estimate the current additive noise or reverberation components and determine appropriate multiplicative attenuation gains. Others aim to apply mappings which project features into more robust domains.

BRIEF SUMMARY

Methods, systems, and apparatuses are described for performing adaptive modulation filtering to enhance audio spectral features (e.g., linear spectral amplitudes (power, phase, magnitude amplitudes, etc.), warped-frequency spectral amplitudes (e.g., Mel-filtered spectra), log-spectral amplitudes, and cepstra), substantially as shown in and/or described herein in connection with at least one of the figures, as set forth more completely in the claims.

BRIEF DESCRIPTION OF THE DRAWINGS/FIGURES

The accompanying drawings, which are incorporated herein and form a part of the specification, illustrate embodiments and, together with the description, further serve to explain the principles of the embodiments and to enable a person skilled in the pertinent art to make and use the embodiments.

Figure 1:
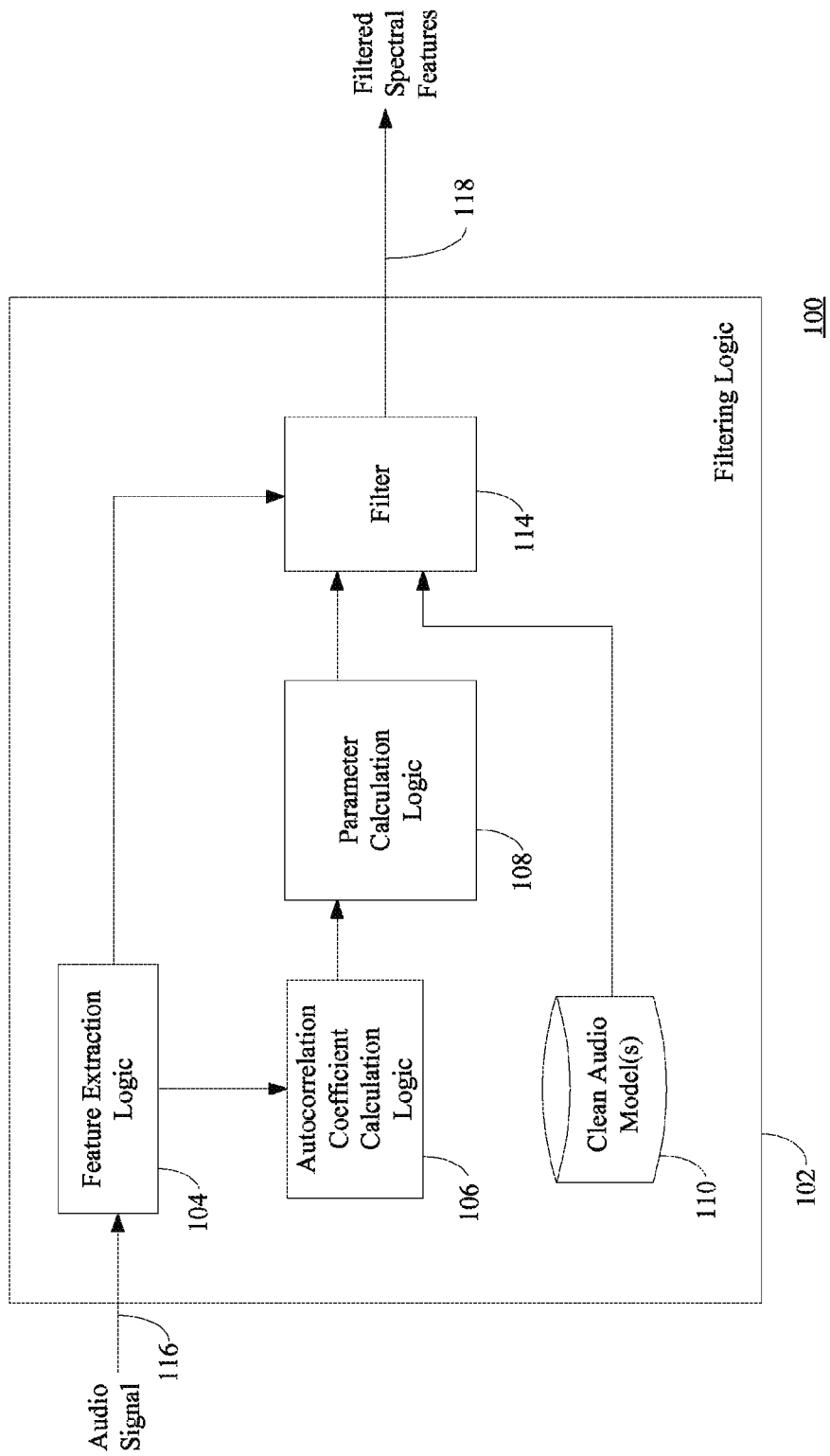
FIG. 1 is a block diagram of an implementation of filtering logic that is configured to perform adaptive modulation filtering in accordance with an embodiment.

Embodiments will now be described with reference to the accompanying drawings.

DETAILED DESCRIPTION

I. Introduction

The present specification discloses numerous example embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Techniques described herein are directed to the enhancement of spectral features of an audio signal via adaptive modulation filtering. Modulation filtering refers to the processing of the envelope of an amplitude modulated (AM) signal. For short-time spectral analysis of speech, the outputs of the individual Fast Fourier Transform (FFT) channels (e.g., bins) can be interpreted as AM signals, where the spectral trajectory of the spectral features represents the modulation envelope, and the FFT basis functions represent the carrier signals.

The adaptive modulation filtering process may be based on observed modulation envelope autocorrelation coefficients obtained from the audio signal. The modulation envelope autocorrelation coefficients are used to determine parameters of an adaptive filter configured to filter the spectral features of the audio signal to provide filtered spectral features. The parameters are updated based on the observed modulation envelope autocorrelation coefficients to adapt to changing acoustic conditions, such as signal-to-noise ratio (SNR) or reverberation time. Accordingly, such acoustic conditions are not required to be estimated explicitly.

Techniques described herein also allow for the estimation of useful side information, e.g., signal-to-noise ratios, based on the observed spectral features of the audio signal and the filtered spectral features, which can be used to improve speaker identification algorithms and/or other audio processing algorithms.

In particular, a method is described herein. In accordance with the method, first spectral features of one or more first frames in a series of frames that represent an audio signal are determined. One or more autocorrelation coefficients of a modulation envelope of the audio signal are obtained based on at least the first spectral features of the first frame(s). Parameters of an adaptive modulation filter used to filter spectral features of the audio signal are modified based on the autocorrelation coefficient(s). Second spectral features of one or more second frames in the series of frames are determined. The autocorrelation coefficient(s) are updated based on at least the second spectral features of the second frame(s). The parameters of the adaptive modulation filter are modified based on the updated autocorrelation coefficient(s).

A method for identifying a target speaker is also described herein. In accordance with the method, spectral features of an audio signal are obtained. A signal-to-noise ratio for the audio signal is obtained that is based at least on the spectral features. A speaker model is adapted based on the signal-to-noise ratio. A likelihood that the audio signal is associated with the target speaker is determined based on the adapted speaker model.

A system is also described herein. The system includes feature extraction logic, autocorrelation logic and parameter calculation logic. The feature extraction logic is configured to determine first spectral features of one or more first frames in a series of frames that represent an audio signal. The autocorrelation coefficient calculation logic is configured to obtain one or more autocorrelation coefficients of a modulation envelope of the audio signal based on at least the first spectral features of the first frame(s). The parameter calculation logic is configured to modify parameters of an adaptive modulation filter used to filter spectral features of the audio signal based on the autocorrelation coefficient(s). The feature extraction logic is further configured to determine second spectral features of one or more second frames in the series of frames. The autocorrelation coefficient calculation logic is further configured to update the autocorrelation coefficient(s) based on at least the second spectral features of the second frame(s). The parameter calculation logic is further configured to modify the parameters of the adaptive modulation filter based on the updated autocorrelation coefficient(s).

II. Example Systems and Methods for Adaptive Modulation Filtering for Spectral Feature Enhancement Embodiments described herein may be used to obtain enhanced (e.g., filtered) spectral features of an audio signal. The filtered spectral features may be obtained using adaptive modulation filtering as described below in reference to FIG. 1. Once obtained, the filtered spectral features may be used to improve speaker identification and/or audio processing algorithms as described below in reference to FIG. 5. The filtered spectral feature(s) may also be used in a communication device to obtain a filtered audio signal that can be provided to a near-end user and/or a far-end user for playback as described below in reference to FIG. 7.

FIG. 1 is a block diagram of an implementation 100 of filtering logic 102 that is configured to perform adaptive modulation filtering in accordance with an embodiment. As shown in FIG. 1, filtering logic 102 includes feature extraction logic 104, autocorrelation coefficient calculation logic 106, parameter calculation logic 108, a data store 110 that stores clean audio model(s), and a filter 114.

Feature extraction logic 104 may be configured to receive a time domain representation of an audio signal 116. Audio signal 116 may comprise a combination of clean audio (e.g., clean speech) and/or one or more forms of distortion. Examples of such distortion include convolution distortion due to reverberation, additive distortion due to diffuse background noise, and/or the like. A degraded audio signal (i.e., an audio signal including various forms of distortion) in the time domain may be characterized by the following equation:

$$y(n) = \sum_{l}^{\infty} h(l)x(n-l) + d(n), \quad \text{Equation 1}$$

where, y(n) corresponds to the degraded audio signal, x(n) corresponds to the underlying clean audio (i.e., the audio signal without any forms of distortion), h(n) corresponds to the causal room impulse response (i.e., reverberation), d(n) corresponds to the additive distortion, and n and/are time indices of a sampled signal (e.g., audio signal 116). As shown in Equation 1, the degraded audio signal y(n) can be modeled as a convolution of the underlying clean audio, x(n), and the causal room impulse response, h(n), plus the additive distortion d(n).

Feature extraction logic 104 may be configured to apply an analysis scheme to audio signal 116 to obtain spectral features associated with audio signal 116. When applying an analysis scheme, successive, overlapping windows may be applied to audio signal 116 in the time domain, and each window may be converted to the frequency domain on a channel-by-channel basis. The windows may be any suitable type of window, such as a Hamming window. Each windowed representation may represent a respective frame of audio signal 116. Each frame for each channel may be converted to the frequency domain using any suitable type of transform, such as a Fast Fourier transform. The result of this conversion yields spectral features for each frame for each channel of audio signal 116.

In accordance with an embodiment, a short-time spectral analysis scheme is used, where short (e.g., 20-30 millisecond), overlapping windows are applied to audio signal 116, and each short window is converted to the frequency domain on a channel-by-channel basis using a short-time Fourier transform (STFT). The result of such a scheme reveals channel-specific trajectories of spectral features of audio signal 116 along a time axis (i.e., modulation envelopes). When applying a short-time spectral analysis scheme to y(n), Equation 1 may be characterized as an approximation of short-time spectra, as shown in Equation 2 below:

$$Y_k(m) \approx \sum_{l}^{\infty} H_k(l) X_k(m-l) + D_k(m), \quad \text{Equation 2}$$

where, $X_k$ denotes the STFT of x(n), $Y_k$ denotes the STFT of y(n) (i.e., short-time spectral features), $D_k$ denotes the STFT of d(n), $H_k(m)$ characterizes the inter-frame effect of reverberation, k denotes a channel (e.g., frequency bin) index and m denotes a time (i.e., frame) index. As shown in Equation 2, the effect of reverberation along short-time spectral envelopes may be modeled as a channel-wise convolution.

The spectral features that may be obtained by applying short-time spectral analysis to the one or more frames of audio signal 116 include, but are not limited to, linear spectral amplitudes (power, phase, magnitude amplitudes, etc.), warped-frequency spectral amplitudes (e.g., Mel-filtered spectra), log-spectral amplitudes, and cepstra.

For example, log-spectral amplitudes may be obtained by performing a logarithmic operation with respect to Equation 2, as shown below in Equation 3:

$$\log Y_k(m) \approx \log(\sum_{l}^{\infty} H_k(l) X_k(m-l) + D_k(m)), \quad \text{Equation 3}$$

where log $Y_k(m)$ denotes the log-spectral amplitude at a given time (or frame) m.

Autocorrelation coefficient calculation logic 106 may be configured to obtain one or more autocorrelation coefficients of the modulation envelope of audio signal 116. Autocorrelation coefficient(s) may be obtained for each frame of each channel of audio signal 116. An autocorrelation coefficient represents a correlation between spectral features of a given frame and spectral features of another frame. The other frame may be the same frame or a frame that precedes the given frame.

An autocorrelation coefficient of the modulation envelope of audio signal 116 may be based on a running average of the autocorrelation coefficient for frames received within a given time interval as shown in Equation 4:

$$r_{Y,k}(n) = \frac{1}{T}\sum_{l=0}^{T-1} Y_k(l)Y_k(l-n),\qquad\text{Equation 4}$$

where n corresponds to a delay, l corresponds to a time (e.g., frame) index, T corresponds to a total number of frames received over a given time interval and $r_{Y,k}(n)$ corresponds to the autocorrelation coefficient for delay n.

As shown in Equation 4, for a given frame l in a series of frames T, an autocorrelation coefficient is obtained between l and a preceding frame (l−n). The autocorrelation coefficients obtained from each iteration are then summed and divided by the number of frames in the series of frames T to obtain an average autocorrelation coefficient result. The average correlation coefficient result may be used as the autocorrelation coefficient.

In accordance with an embodiment, autocorrelation coefficients may be further updated to adapt to changing acoustic conditions as shown below in Equation 5:

$$r_{Y,k}(n) = \alpha r_{Y,k}^{m-1}(n) + (1-\alpha)Y_k(m)Y_k(m-n),\qquad\text{Equation 5}$$

where $\alpha$ corresponds to a weighting coefficient and m corresponds to a time (e.g., frame) index.

During initial operation, autocorrelation coefficient calculation logic 106 may weight a correlation between spectral features of a current frame and spectral features of one or more preceding frames (i.e., $Y_k(m)Y_k(m-n)$) more heavily than the average autocorrelation coefficient result (i.e., $r_{Y,k}^{m-1}(n)$) when computing an autocorrelation coefficient due to the lack of frames received. To weight the correlation between spectral features of a current frame and spectral features of preceding frame(s) more heavily, $\alpha$ may be set to value less than 0.50. However, over time, as more frames are received, autocorrelation coefficient calculation logic 106 may weight the average autocorrelation coefficient result more heavily rather than the correlation between spectral features of the current frame and spectral features of preceding frame(s) to determine the autocorrelation coefficient. To weight the average correlation coefficient result more heavily, $\alpha$ may be set to value greater than 0.50. Accordingly, $\alpha$ may be adapted over time to update a given autocorrelation coefficient. That is, the value of $\alpha$ may be increased as a function of time, where the value of alpha approaches '1' as time progresses.

In accordance with an embodiment where filtering logic 102 is implemented in a communication device, the value of $\alpha$ may be based on a length of a communication session. For example, the average correlation coefficient result may be weighted more heavily than the correlation between spectral features of the current frame and spectral features of preceding frame(s) (i.e., $\alpha$ is set to a value greater than 0.50) if the length of a communication session exceeds a predetermined threshold, and the correlation between spectral features of the current frame and spectral features of preceding frame(s) may be weighted more heavily than the average autocorrelation coefficient (i.e., $\alpha$ is set to a value less than 0.50) if the length of the communication session does not exceed the predetermined threshold.

In accordance with another embodiment, the value of $\alpha$ may also be adapted to account for changes in the acoustic environment, where the value of $\alpha$ is decreased to emphasize the more recent observations when a change in the acoustic environment is determined (i.e., the correlation between spectral features of the current frame and spectral features of preceding frame(s) is weighted more heavily than the average autocorrelation coefficient result). Examples of acoustic environment changes may include, but are not limited to, a user (using a device in which the embodiments disclosed herein are implemented) walking into a room having different acoustical characteristics, a change in the level of diffuse background noise, etc.

The obtained and updated autocorrelation coefficients may be used to construct a covariance matrix (as shown below in Equation 6) and an autocorrelation vector (as shown below in Equation 7).

$$R_{Y,k} = \begin{bmatrix} r_{Y,k}(0) & r_{Y,k}(1) & \cdots & r_{Y,k}(P-1) \\ r_{Y,k}(1) & r_{Y,k}(0) & \cdots & \vdots \\ \vdots & \vdots & \ddots & \vdots \\ r_{Y,k}(P-1) & r_{Y,k}(0) & \cdots & r_{Y,k}(0) \end{bmatrix},\qquad\text{Equation 6}$$

$$r_{Y,k} = [r_{Y,k}(1),\ r_{Y,k}(2),\ \ldots,\ r_{Y,k}(P)]^T,\qquad\text{Equation 7}$$

where P corresponds to a prediction order that corresponds to the order of a filter (e.g., filter 114) used to provide filtered spectral features 118. The covariance matrix and autocorrelation vector are provided to parameter calculation logic 108.

Parameter calculation logic 108 may be configured to receive the covariance matrix and autocorrelation vector and obtain parameters based on the covariance matrix and autocorrelation vector. As will be described below, the parameters are used by filter 114 to provide filtered spectral features 118. In accordance with an embodiment, parameter calculation logic 108 applies linear prediction to the covariance matrix and autocorrelation vector to provide parameters to be used by filter 114. In accordance with such an embodiment, the parameters include linear prediction coefficients and gain values. The linear prediction coefficients may be obtained in accordance with Equation 8:

$$a_{Y,k} = R_{Y,k}^{-1} r_{Y,k},\qquad\text{Equation 8}$$

where $R_{Y,k}^{-1}$ is the inverse of $R_{Y,k}$ (as obtained by Equation 6) and $a_{Y,k}$ corresponds to a vector of linear prediction coefficients. It is noted there are other ways for determining the linear prediction coefficients other than the one shown in Equation 8. It is further noted that the linear prediction coefficients described above are provided for exemplary purposes and that other types of linear prediction coefficients may be obtained.

The gain values may be obtained in accordance with Equation 9:

$$\sigma_{Y,k}^2 = r_{Y,k}(0) - a_{Y,k}^T r_{Y,k},\qquad\text{Equation 9}$$

where $\sigma_{Y,k}^2$ represents the gain value for spectral feature Y of a given channel k of audio signal 116. Each gain value may represent the gain of the linear prediction error of spectral features of a given channel of audio signal 116. The parameters (e.g., the linear prediction coefficients and the gain values) obtained for the frame(s) of audio signal 116 are provided to filter 114.

Filter 114 may be configured to filter spectral features of audio signal 116 based on the parameters obtained for audio signal 116 and parameters obtained for a clean audio signal to provide filtered spectral features 118. As described above, the parameters for audio signal 116 may be obtained and provided by parameter calculation logic 108. The parameters for the clean audio signal may be obtained from data store 110. For example, data store 110 may be configured to store parameters (e.g., linear prediction coefficients and gain values) that are associated with a clean audio signal. Such parameters may be obtained during an off-line training process, where a clean audio signal is processed in a similar manner as described above with respect to audio signal 116.

Filter 114 may be configured to filter spectral features based on models of the modulation spectrum of audio signal 116 and the modulation spectrum of a clean audio signal (as opposed to the actual modulation spectrums of audio signal 116 and a clean audio signal).

A modulation spectrum may be defined as the frequency content of the modulation envelope extracted from a particular channel of an audio signal. The modulation spectrum may be determined by applying a discrete-time Fourier transform to successive spectral features along the time axis, as is shown below with respect to Equation 10:

$$M_{Y,k}(\omega) = \sum_{m}^{\infty} Y_k(m) e^{-j\omega m}, \qquad \text{Equation 10}$$

where $M_{Y,k}$ represents the modulation spectrum for a given audio signal. Basing filter 114 on the actual modulation spectrum requires a transformation into the modulation spectral domain, which is compute-intensive.

In accordance with an embodiment, filter 114 may be based on all-pole models of the modulation spectrum of audio signal 116 and the modulation spectrum of a clean audio signal. In accordance with such an embodiment, the all-pole model of audio signal 116 may be defined in accordance with Equation 11, and the all-pole model of the clean audio signal may be defined in accordance with Equation 12, as shown below:

$$|M_{Y,k}(\omega)|^2 = \left| \frac{\sigma_{Y,k}}{1 - \sum_{l=1}^{P} a_{Y,k}(l) e^{-j\omega l}} \right|^2, \qquad \text{Equation 11}$$

where $|M_{Y,k}(\omega)|^2$ corresponds to the all-pole model of the modulation spectrum of audio signal 116, $a_{Y,k}(l)$ corresponds to an element l of vector $r_{Y,k}$ of Equation 7;

$$|M_{X,k}(\omega)|^2 = \left| \frac{\sigma_{X,k}}{1 - \sum_{l=1}^{P} a_{X,k}(l) e^{-j\omega l}} \right|^2, \qquad \text{Equation 12}$$

where $|M_{X,k}(\omega)|^2$ corresponds to the all-pole model of the modulation spectrum of the clean audio signal, X corresponds to a spectral feature of the clean audio signal, $\sigma_{X,k}$ corresponds to the gain value for a clean spectral feature X of a given channel k of the clean audio signal, and $a_{X,k}(l)$ corresponds to an element of a vector $r_{X,k}$ that is formulated in a similar manner as described above with respect to Equation 7.

Based on these all-pole models, filter 114 may filter spectral features of audio signal 116 based on the all-pole model of the modulation spectrum for a clean audio signal and the all-pole model of the modulation spectrum of audio signal 116. For example, in accordance with an embodiment, filter 114 may be a modulation spectrum inverse filter defined in accordance with Equation 13 shown below:

$$|M_{H,k}(\omega)| = \frac{\sigma_{X,k} \left| 1 - \sum_{l=1}^{P} a_{Y,k}(l) e^{-j\omega l} \right|}{\sigma_{Y,k} \left| 1 - \sum_{l=1}^{P} a_{X,k}(l) e^{-j\omega l} \right|}, \qquad \text{Equation 13}$$

where $|M_{H,k}(\omega)|$ corresponds to the magnitude frequency response associated with audio signal 116. As shown below in Equation 14, a minimum phase solution may be applied to the magnitude frequency response by applying an inverse discrete-time Fourier transform (DTFT) to the numerator and denominator of Equation 13 to match the causal nature of reverberation in the short-time spectral domain, thereby resulting in filtered spectral features of audio signal 116 (e.g., filtered spectral features 118):

$$|\hat{X}_K(m)| = \frac{\sigma_{X,k}}{\sigma_{Y,k}} \left( |Y_k(m)| - \sum_{l=1}^{P} a_{Y,k}(l) |Y_k(m-l)| \right) + \sum_{l=1}^{P} a_{X,k}(l) |\hat{X}_K(m-l)|, \qquad \text{Equation 14}$$

where $\hat{X}_K(m)$ corresponds to the filtered spectral feature(s) (e.g., filtered spectral features 118) for a given channel K during given time (e.g., frame) m. Each channel of the observed short-time spectra may be filtered in accordance with Equation 14 to obtain filtered spectral features 118.

In accordance with another embodiment, filter 114 may be Wiener filter defined in accordance with Equation 15 shown below:

$$|M_{H,k}(\omega)| = \frac{\sigma_{X,k}^2 \left| 1 - \sum_{l=1}^{P} a_{Y,k}(l) e^{-j\omega l} \right|^2}{\sigma_{Y,k}^2 \left| 1 - \sum_{l=1}^{P} a_{X,k}(l) e^{-j\omega l} \right|^2}, \qquad \text{Equation 15}$$

where $|M_{H,k}(\omega)|$ corresponds to the magnitude frequency response associated with audio signal 116. As shown below in Equation 16, a minimum phase solution may applied to the magnitude frequency response by applying an inverse discrete-time Fourier transform (DTFT) to the numerator and denominator of Equation 15 to match the causal nature of reverberation in the short-time spectral domain, thereby resulting in filtered spectral features of audio signal 116 (e.g., filtered spectral features 118):

$$|\hat{X}_K(m)| = \frac{\sigma_{X,k}}{\sigma_{Y,k}} \left( |Y_k(m)| - \sum_{l=1}^{P} \tilde{a}_{Y,k}(l) |Y_k(m-l)| \right) + \sum_{l=1}^{P} \tilde{a}_{X,k}(l) |\hat{X}_K(m-l)|, \qquad \text{Equation 16}$$

where $\hat{X}_K(m)$ corresponds to the filtered spectral feature(s) (e.g., filtered spectral features 118) for a given channel K during a given time (e.g., frame) m, $\tilde{a}_{X,k}$ represents the self-convolution of $a_{X,k}$, and $\tilde{a}_{Y,k}$ represents the self-convolution of $a_{Y,k}$. Each channel of the observed short-time spectra may be filtered in accordance with Equation 16 to obtain filtered spectral features 118.

Basing the filter on all-pole models versus the actual modulation spectrum provides several benefits. For example, all-pole modeling provides smooth spectral transitions within modulation spectra, thereby avoiding rapid fluctuations generally encountered when using large discrete Fourier transforms. This becomes relevant when determining the ratio of modulation spectra between audio signal 116 and a clean audio signal (as described above with respect to Equations 13 and 15), since small values in the denominator can yield fluctuations in filter 114. All-pole modeling also allows for modulation behavior to be summarized by a small set of linear predication coefficients (e.g., an order of 4 or 5 coefficients). Lastly, all-pole modeling allows for efficient implementation of filter 114 in the modulation envelope domain as a low-order IIR filter, thereby avoiding explicit transformation into the modulation spectral domain.

Figure 2:
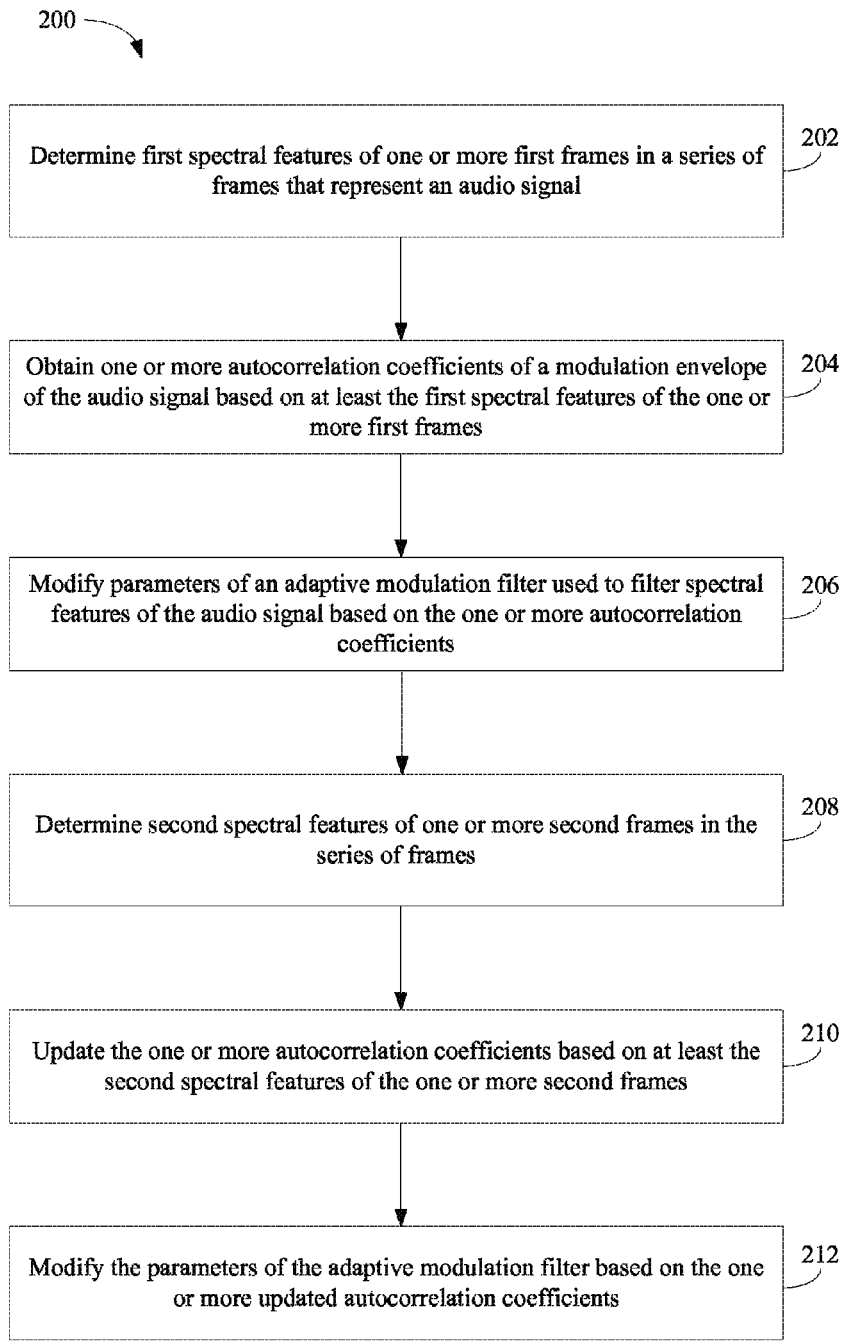
FIG. 2 is a flowchart of a method for filtering spectral features of an audio signal to provide filtered spectral features in accordance with an embodiment.

Accordingly, in embodiments, filtering logic 102 may operate in various ways to filter spectral features of audio signal 116 to provide filtered spectral features 118. FIG. 2 depicts a flowchart 200 of an example method for filtering spectral features of audio signal 116 to provide filtered spectral features 118 in accordance with an embodiment. The method of flowchart 200 will now be described with continued reference to filtering logic 102 of FIG. 1, although the method is not limited to that implementation. Other structural and operational embodiments will be apparent to persons skilled in the relevant art(s) based on the discussion regarding flowchart 200 and filtering logic 102.

As shown in FIG. 2, the method of flowchart 200 begins at step 202, in which first spectral features of one or more first frames in a series of frames that represent an audio signal are determined. For example, with reference to FIG. 1, feature extraction logic 104 determines first spectral features of first frame(s) that represent audio signal 116.

In accordance with an embodiment, feature extraction logic 104 determines the first spectral features by applying a short-time spectral analysis scheme, where short (e.g., 20-30 millisecond), overlapping windows are applied to audio signal 116, and each short window is converted to the frequency domain on a channel-by-channel basis using a short-time Fourier transform (STFT). Examples of spectral features that may be determined include, but are not limited to, linear spectral amplitudes (power, magnitude amplitudes, etc.), warped-frequency spectral amplitudes (e.g., Mel-filtered spectra), log-spectral amplitudes, and cepstra.

At step 204, one or more autocorrelation coefficients of a modulation envelope of the audio signal are obtained based on at least the first spectral features of the first frame(s). For example, with reference to FIG. 1, autocorrelation coefficient calculation logic 106 obtains autocorrelation coefficient(s) of the modulation envelope of audio signal 116 based at least on the first spectral feature(s) obtained by feature extraction logic 104. Each autocorrelation coefficient may represent a correlation between spectral features of a given frame and spectral features of another frame. The other frame may be the same frame or a frame that precedes the given frame.

In accordance with an embodiment, each autocorrelation coefficient may be based on a running average of autocorrelation coefficients for frames received within a given time interval as described above with respect Equation 4. An example method for obtaining autocorrelation coefficients is described below with respect to FIG. 3.

The obtained autocorrelation coefficients may be used to construct a covariance matrix (as described above with respect to Equation 6) and an autocorrelation vector (as described above with respect to Equation 7).

At step 206, parameters of an adaptive modulation filter used to filter spectral features of the audio signal are modified based on the autocorrelation coefficient(s). For example, with reference to FIG. 1, parameter calculation logic 108 may be configured to apply linear prediction to the covariance matrix and autocorrelation vector to provide parameters to be used by filter 114. In accordance with an embodiment, the parameters include linear prediction coefficients and gain values. The linear prediction coefficients may be obtained in accordance with Equation 8, as described above, and the gain values may be obtained in accordance with Equation 9, as described above. Linear prediction coefficient logic 108 may be configured to modify these parameters for certain frames (e.g., each frame, every other frame, every N number of frames, etc.) of audio signal 116 and provide the modified parameters to filter 114.

At step 208, second spectral features of one or more second frames in the series of frames that represent the audio signal are determined. For example, with reference to FIG. 1, feature extraction logic 104 determines second spectral features of second frame(s) that represent audio signal 116. The second frame(s) may be received by feature extraction logic 104 subsequent to the first frame(s) received at step 202.

In accordance with an embodiment, feature extraction logic 104 determines the second spectral features by applying a short-time spectral analysis scheme, where short (e.g., 20-30 millisecond), overlapping windows are applied to audio signal 116, and each short window is converted to the frequency domain on a channel-by-channel basis using a short-time Fourier transform (STFT).

At step 210, the autocorrelation coefficient(s) of the modulation envelope of the audio signal are updated based on at least the second spectral features of the second frame(s) in the series of frames. For example, with reference to FIG. 1, autocorrelation coefficient calculation logic 106 updates autocorrelation coefficient(s) of the modulation envelope of audio signal.

In accordance with an embodiment, each autocorrelation coefficient may be updated to adapt to changing acoustic conditions as described above with respect to Equation 5. An example method for updating autocorrelation coefficients is described below with respect to FIG. 4.

The updated autocorrelation coefficient(s) may be used to update the covariance matrix (as described above with respect to Equation 6) and the autocorrelation vector (as described above with respect to Equation 7).

At step 210, the parameters of an adaptive modulation filter used to filter spectral features of the audio signal are modified based on the updated autocorrelation coefficient(s). For example, with reference to FIG. 1, parameter calculation logic 108 may be configured to apply linear prediction to the updated covariance matrix and autocorrelation vector to provide modified parameters to be used by filter 114. In accordance with an embodiment, the modified parameters include updated linear prediction coefficients and updated gain values. The modified linear prediction coefficients may be obtained in accordance with Equation 8, as described above, and the gain values may be obtained in accordance with Equation 9, as described above.

Figure 3:
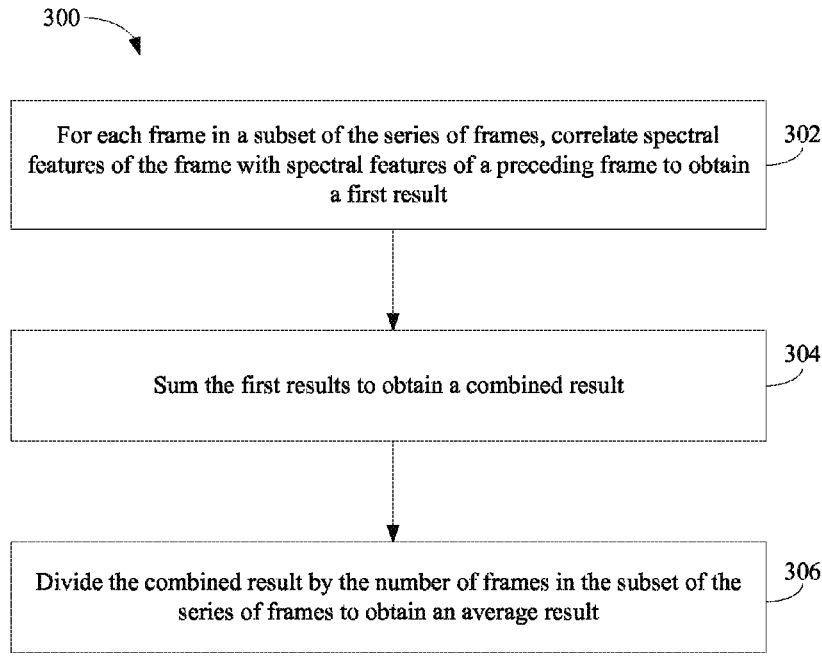
FIG. 3 is a flowchart of a method for obtaining one or more autocorrelation coefficients of a modulation envelope of an audio signal based on at least first spectral features of one or more first frames of the audio signal in accordance with an embodiment.

FIG. 3 depicts a flowchart 300 of an example method for obtaining autocorrelation coefficient(s) of a modulation envelope of an audio signal based on at least first spectral features of first frame(s) of the audio signal in accordance with an embodiment. The method of flowchart 300 will now be described with continued reference to filtering logic 102 of FIG. 1, although the method is not limited to that implementation. Other structural and operational embodiments will be apparent to persons skilled in the relevant art(s) based on the discussion regarding flowchart 300 and filtering logic 102.

As shown in FIG. 3, the method of flowchart 300 begins at step 302. At step 302, for each frame in a subset of the series of frames that represent the audio signal, spectral features of the frame are correlated with spectral features of a preceding frame to obtain a first result. For example, with reference to FIG. 1, autocorrelation coefficient calculation logic 106 correlates spectral features of each frame in a subset of the series of frames that represent audio signal 116 with spectral features of a preceding frame to obtain a first result.

In accordance with an embodiment, the subset of frames corresponds to every frame in the series of frames. In accordance with another embodiment, the subset of frames corresponds to every other frame in the series of frames. In accordance with yet another embodiment, the subset of frames corresponds to every Nth frame in the series of frames, where N is any positive integer.

As described above with respect to Equation 4, spectral features of a frame may be correlated with spectral features of other frame(s) by convolving the spectral features of the frame with the spectral features of the preceding frame(s).

At step 304, the first results are summed to obtain a combined result. For example, with reference to FIG. 1, autocorrelation coefficient calculation logic 106 sums the first results to obtain a combined result.

At step 306, the combined result is divided by the number of frames in the subset of the series of frames to obtain an average result. For example, with reference to FIG. 1, autocorrelation coefficient calculation logic 106 divides the combined result by the number of frames in the subset of the series of frames to obtain the average result. The average result is used as a value for the autocorrelation coefficient.

Steps 302, 304 and 306 of FIG. 3 may be performed in accordance with Equation 4, as described above.

Figure 4:
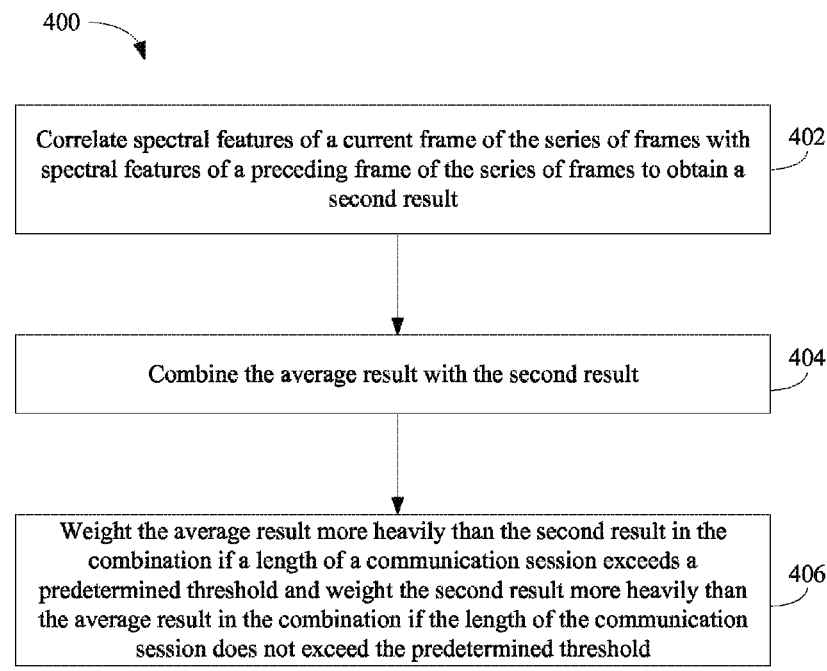
FIG. 4 is a flowchart of a method for updating the autocorrelation coefficient(s) described in FIG. 3 based on at least second spectral features of one or more second frames of the audio signal in accordance with an embodiment.

FIG. 4 depicts a flowchart 400 of an example method for updating autocorrelation coefficient(s) based on at least the second spectral features of the second frame(s) in accordance with an embodiment. The method of flowchart 400 will now be described with continued reference to filtering logic 102 of FIG. 1, although the method is not limited to that implementation. Other structural and operational embodiments will be apparent to persons skilled in the relevant art(s) based on the discussion regarding flowchart 400 and filtering logic 102.

As shown in FIG. 4, the method of flowchart 400 begins at step 402, in which spectral features of a current frame of the series of frames are correlated with spectral features of a preceding frame of the series of frames to obtain a second result. For example, with reference to FIG. 1, autocorrelation coefficient calculation logic 106 correlates spectral features of the current frame in the subset of the series of frames that represent audio signal 116 with spectral features of a preceding frame of the series of frames to obtain a second result.

In accordance with an embodiment, the subset of frames corresponds to every frame in the series of frames. In accordance with another embodiment, the preceding frame corresponds to the first frame received prior to the current frame. In accordance with yet another embodiment, the preceding frame corresponds to an Nth frame received prior to the current frame, where N is any positive integer.

As described above with respect to Equation 5, spectral features of a current frame may be correlated with spectral features of a preceding frame by convolving the spectral features of the current frame with the spectral features of the preceding frame.

At step 404, the average result is combined with the second result. For example, with reference to FIG. 1, autocorrelation coefficient calculation logic 106 combines the average result with the second result. In accordance with an embodiment, the average result is combined with the second result by adding the average result to the second result, as is shown above with respect to Equation 5.

The average result and the second result may each be weighted. For example, the average result may be weighted based on a weighting coefficient $\alpha$, and the second result may be weighted based on a subtracted from one (i.e., $1-\alpha$). In accordance with an embodiment, the value of a may be increased as a function of time, where the value of $\alpha$ approaches '1' as time progresses. In accordance with such an embodiment, the second result is initially weighted more heavily than the average result. As time progresses, the average result becomes more heavily weighted than the second result.

For example, in accordance with an embodiment, the average result and the second result may each be weighted based on a length of a communication session. In accordance with such an embodiment, at step 406, the average result is weighted more heavily than the second result in the combination if a length of a communication session exceeds a predetermined threshold and the second result is weighted more heavily than the average result in the combination if the length of the communication session does not exceed the predetermined threshold. For example, with reference to FIG. 1, autocorrelation coefficient calculation logic 106 weights the average result more heavily than the second result in the combination if the length of the communication session exceeds the predetermined threshold and weights the second result more heavily than the average result in the combination if the length of the communication session does not exceed the predetermined threshold.

Steps 402, 404 and 406 of FIG. 4 may be performed in accordance with Equation 5, as described above.

Figure 5:
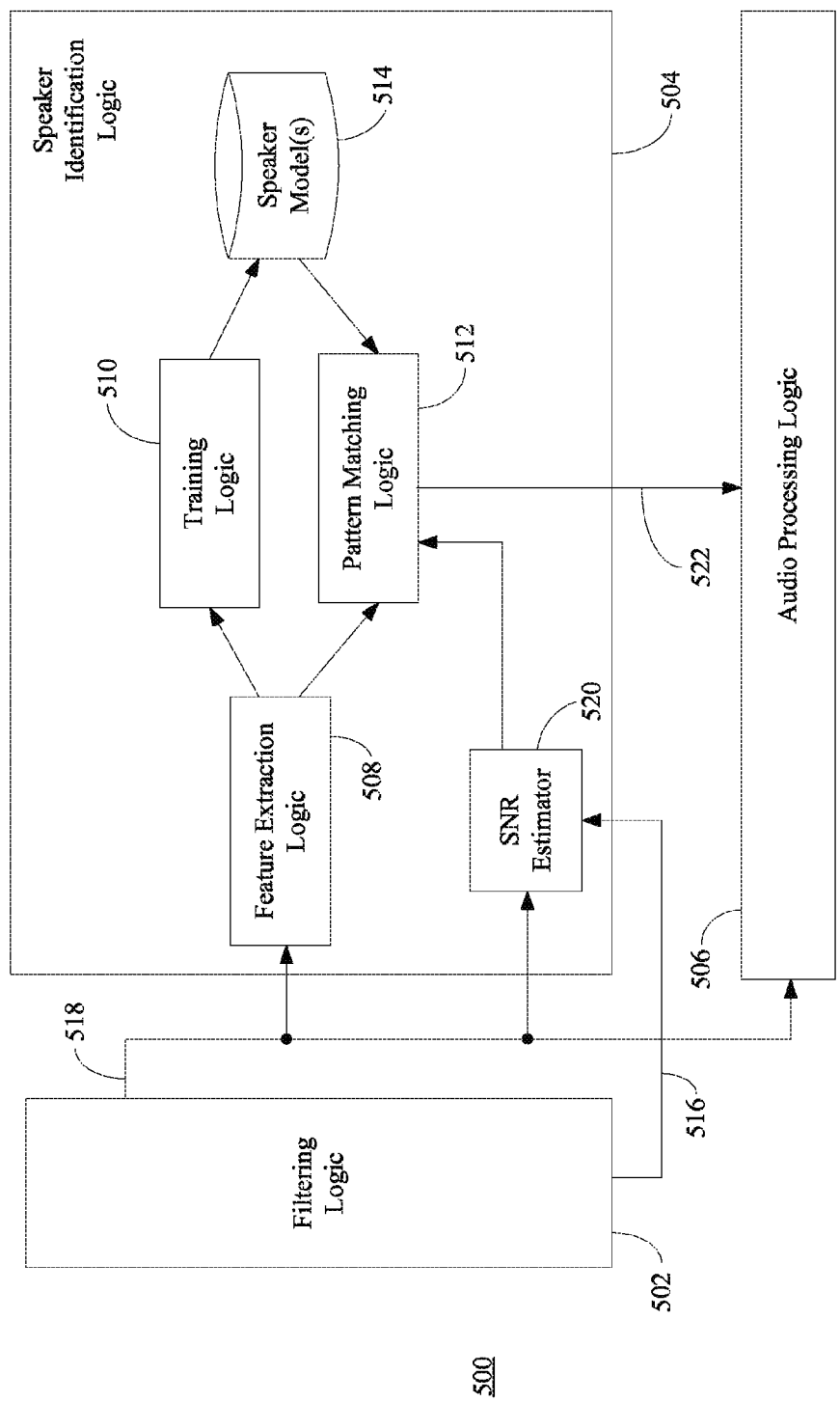
FIG. 5 is a block diagram of a system that is configured to perform speaker identification and/or audio processing based on enhanced (i.e., filtered) spectral features in accordance with an embodiment.

III. Improved Speaker Identification and Audio Processing Based on Enhanced Features Filtered spectral features may be used to improve speaker identification (SID) and/or other one or more audio processing algorithms (e.g., speech processing algorithm(s)). FIG. 5 is a block diagram of a system 500 that is configured to perform SID and/or audio processing based on enhanced (i.e., filtered) spectral features in accordance with an embodiment. As shown in FIG. 5, system 500 includes filtering logic 502, speaker identification (SID) logic 504 and audio processing logic 506. Filtering logic 502 may comprise an implementation of filtering logic 102 as described above in reference to FIG. 1. Filtering logic 502 may be configured to provide spectral features 516 and filtered spectral features 518. Spectral features 516 may correspond to spectral features 116, which are obtained by feature extraction logic 104 as described above in reference to FIG. 1. Filtered spectral features 518 may correspond to filtered spectral features 118 that are provided by filter 114 as described above in reference to FIG. 1. Filtering logic 502, SID logic 504 and/or audio processing logic 506 may be configured to perform operations disclosed herein on a channel-by-channel basis.

SID logic 504 may be configured to receive spectral features 516 and filtered spectral features 518 and perform SID operations based thereon to identify a target speaker associated with an audio signal (e.g., audio signal 116). System 500 may be implemented in the uplink and/or downlink path of a communication device, as described below in reference to FIG. 7. Accordingly, a target speaker may be a near-end speaker or a far-end speaker. As shown in FIG. 5, SID logic 504 includes feature extraction logic 508, training logic 510, pattern matching logic 512, one or more speaker models 514 and a signal-to-noise (SNR) estimator 520.

Feature extraction logic 508 may be configured to continuously collect and analyze filtered spectral features 518 on a frame-by-frame and/or a channel-by-channel basis to extract further feature(s) therefrom. Examples of filtered spectral features 518 that are collected and analyzed by feature extraction logic 508 may include, but are not limited to, warped-frequency spectral amplitudes (e.g., Mel-filtered spectra) and cepstra. In an embodiment, spectral feature(s) extracted for each frame by feature extraction logic 508 are mapped to a multidimensional feature space, thereby generating a feature vector for each frame. For speaker identification, features that exhibit high speaker discrimination power, high interspeaker variability, and low intraspeaker variability are desired. Examples of various features that feature extraction logic 508 may extract from spectral features 518 are described in Campbell, Jr., J., "Speaker Recognition: A Tutorial," Proceedings of the IEEE, Vol. 85, No. 9, September 1997, the entirety of which is incorporated by referenced herein. Such features may include, for example, reflection coefficients (RCs), log-area ratios (LARs), arcsin of RCs, line spectrum pair (LSP) frequencies, and the linear prediction (LP) cepstrum.

Training logic 510 may be configured to receive spectral feature(s) extracted by feature extraction logic 508 and process such feature(s) to generate a speaker model 514 for a desired speaker (i.e., a near-end speaker and/or a far-end speaker). In an embodiment, speaker model 514 is represented as a Gaussian Mixture Model (GMM) that is derived from a universal background model (UBM). That is, the UBM serves as a basis for generating a GMM speaker model for the desired speaker. The GMM speaker model may be generated based on a maximum a posteriori (MAP) method, where a soft class label is generated for each portion (e.g., frame) of the audio signal received (e.g., audio signal 116). A soft class label is a value representative of a probability that the portion being analyzed is from the target speaker.

Once speaker model 514 is obtained, pattern matching logic 512 may be configured to receive feature(s) extracted from other frames of the audio signal (e.g., frame(s) received subsequent to obtaining speaker model 514) and compare such feature(s) to speaker model 514 to generate a measure of confidence 522, which is indicative of the likelihood that the other frames of the received audio signal are associated with the target user. Measure of confidence 522 is continuously generated for each frame of the audio signal that is received. Measure of confidence 522 may be determined based on a degree of similarity between the feature(s) extracted by feature extraction logic 508 and speaker model 514. The greater the similarity between the extracted feature(s) and speaker model 514, the more likely that the received audio signal is associated with the user whose voice was used to generate speaker model 514. In an embodiment, measure of confidence 522 is a Logarithmic Likelihood Ratio (LLR) that is calculated in accordance with Equation 17 as shown below:

$$LLR(x) = \log\frac{p(x|H_T)}{p(x|H_N)} \approx \sum_i \log p(x_i|H_T) - \sum_i \log p(x_i|H_N),$$

Equation 17

As shown in Equation 17, the LLR is equal to the logarithm of the ratio of the conditional probability of the current observation given that the current frame being analyzed is spoken by the target speaker (i.e., $p(x|H_T)$) divided by the conditional probability of the current observation given that the current frame being analyzed is not spoken by the target speaker (i.e., $p(x|H_N)$), where x corresponds to a given frame, $H_T$ corresponds to a speaker model associated with the target user, $H_N$ corresponds to a speaker model associated with a non-target user (e.g., the UBM), and i corresponds to a time (e.g., frame) index.

$p(x_i|H_T)$ is a function of the mixtures that make up the GMM, as shown below in Equation 18:

$$p(x_i|H_T) \propto \sum_j \frac{w_j}{|\Sigma_j|^{1/2}} \exp\left(-\frac{1}{2}(x_i-\mu_j)^T \Sigma_j^{-1}(x_i-\mu_j)\right),$$

Equation 18 where j corresponds to a mixture of the GMM generated and used to represent speaker model 514, $w_j$ corresponds to a weight for the jth mixture, which when summed, is equal to one, $\Sigma_j$ corresponds to the covariance matrix of the jth mixture, $\Sigma_j^{-1}$ corresponds to the inverse covariance matrix of the jth mixture and $\mu_j$ corresponds to the mean vector for the jth mixture.

When attempting to match spectral features extracted by feature extraction logic 508 to speaker model 514, mismatches may occur if the spectral features include various forms of distortion since the trained GMM (i.e., speaker model 514) is based on clean spectral features. Even though the spectral features may have been filtered (e.g., by filter 114), some uncertainty can be expected for spectral features with low SNR.

To prevent such mismatches, in accordance with an embodiment, speaker model 514 may be adapted to take into account the noise included in the spectral features extracted by feature extraction logic 508. In accordance with such an embodiment, an SNR of the received audio signal (i.e., audio signal 116) is estimated, and the SNR estimate is used to adapt speaker model 514. The noise measured to obtain the SNR estimate may comprise convolution distortion due to reverberation, additive distortion due to diffuse background noise, and/or the like.

As shown in FIG. 5, SNR estimator 520 may be configured to estimate an SNR of a received audio signal. In accordance with an embodiment, SNR estimator 520 is configured to estimate the SNR based on spectral features 516 and filtered spectral features 518 provided by filtering logic 502.

In accordance with such an embodiment, the SNR may be calculated in accordance with Equation 19 as shown below:

$$\xi_{k,m} = \frac{|\hat{X}_k(m)|^2}{|Y_k(m)|^2 - |\hat{X}_k(m)|^2}, \quad \text{Equation 19}$$

where m corresponds to a time (or frame) index, $\hat{X}_k(m)$ corresponds to filtered spectral features 518 for a given channel k during a given time (or frame) and $\xi_{k,m}$ corresponds to the SNR estimate for a given channel k during a given time (or frame) m. It is noted that in other embodiments, the SNR estimate may be obtained using other methods known in the art.

The SNR estimate may be provided to pattern matching logic 512. Pattern matching logic 512 may be configured to align the SNR estimate to a mixture of the GMM representing speaker model 514 that most closely resembles the spectral features extracted by feature extraction logic 508. For example, pattern matching logic 512 may be configured to determine an SNR estimate for each mixture of the GMM representing speaker model 514. The SNR estimate for each mixture may be determined in accordance with Equation 20 as shown below:

$$\xi_{k,m|j} = \frac{|\hat{X}_k(m)|^2}{|Y_k(m)|^2 - |\hat{X}_k(m)|^2} P(m_j | Y_k(m)), \quad \text{Equation 20}$$

where $P(m_j|Y_k(m))$ represents the probability that a given spectral feature $Y_k$, (e.g., spectral feature 516) for a given channel k corresponds to a particular mixture j of the GMM representing speaker model 514 during a given time (or frame) m, and $\xi_{k,m|j}$ corresponds to the SNR estimate for a given channel k and time (or frame) m that was obtained for a given mixture j. In accordance with Equation 20, the lower the probability that the spectral feature $Y_k$ corresponds to a particular mixture j, the lower the SNR estimate is for that mixture. Accordingly, if the probability that the spectral feature $Y_k$ corresponds to the particular mixture is zero, the SNR estimate for that mixture is also zero. As such, the SNR estimate may be aligned to the mixture for which the probability is the highest.

Pattern matching logic 512 may be further configured to form a matrix including the SNR estimates for each mixture j for a given time (or frame) m and channel k. In accordance with an embodiment, the matrix is a diagonal matrix, as shown below with respect to Equation 21:

$$\Phi_{m|j} = \text{diag}\{\xi_{1,m|j}, \xi_{2,m|j}, \ldots, \xi_{k,m|j}\}, \quad \text{Equation 21}$$

Using the matrix, pattern matching logic 512 may be configured to adapt the GMM representing speaker model 514 to the obtained SNR estimates to account for the distortion included therein. Once adapted, pattern matching logic 512 may be configured to compare the spectral features extracted by feature extraction logic 508 to the adapted GMM (i.e., an adapted version of speaker model 514) to determine whether the received audio signal is from the target speaker.

In accordance with an embodiment, pattern matching logic 512 is configured to adapt the GMM representing speaker model 514 by adapting the covariance matrices associated with the mixture models based on the matrix of obtained SNR estimates (e.g., the diagonal matrix as shown in Equation 21).

In accordance with such an embodiment, the covariance matrix $\Sigma_j$ may be adapted in accordance with Equation 22 as shown below:

$$\hat{\Sigma}_j = \Sigma_j(I+\Phi_{m|j}^{-1}), \quad \text{Equation 22}$$

where I corresponds to an identity matrix, $\Phi_{m|j}^{-1}$ corresponds to the inverse of the diagonal matrix $\Phi_{m|j}$ for a given mixture j and time (or frame) m and $\hat{\Sigma}_j$ corresponds to the adapted covariance matrix for a given mixture j.

As shown in Equation 22, the adaptive covariance matrix $\hat{\Sigma}_j$ is equal to the original covariance matrix $\Sigma_j$ multiplied by an identity matrix I plus the inverse of the matrix of SNR estimates $\Phi_{m|j}^{-1}$. Accordingly, if the SNR estimate for a given channel and/or time (or frame) is high (i.e., the received audio signal is clean), $\Phi_{m|j}^{-1}$ approaches zero, and the adapted covariance matrix $\hat{\Sigma}_1$ becomes equal to the original covariance matrix $\Sigma_j$. On the other hand, if the SNR estimate for a given channel and/or time (or frame) is low (i.e., the received audio signal contains distortion), $\Phi_{m|j}^{-1}$ increases due to the increase in energy in the received audio signal, thereby expanding (i.e., adapting) the covariance matrix.

The magnitude and inverse of the adaptive covariance matrix $\hat{\Sigma}_j$ may be determined in accordance with Equations 23 and 24, respectively, as shown below:

$$|\hat{\Sigma}_j| = |\Sigma_j| \prod_k (1 + \xi_{k,m|j}^{-1}), \quad \text{Equation 23}$$

$$\hat{\Sigma}_j^{-1} = (I + \Phi_{m|j}^{-1})^{-1} \Sigma_j^{-1}, \quad \text{Equation 24}$$

where $\Phi_{k,\ m|j}^{-1}$ corresponds to the inverse of an SNR estimate for a given channel k and time (or frame) m that was obtained for a given mixture j, $|\hat{\Sigma}_j|$ corresponds to the magnitude of the adapted covariance matrix $\hat{\Sigma}_j$ and $\hat{\Sigma}_j^{-1}$ corresponds to the inverse of the adapted covariance matrix $\hat{\Sigma}_j$.

Using the adapted covariance matrix $\hat{\Sigma}_j$, $p(x_i|H_T)$ may then be determined in accordance with Equation 25 as shown below:

$$p(x_i | H_T) \propto \sum_j \frac{w_j}{|\hat{\Sigma}_j|^{1/2}} \exp\left(-\frac{1}{2}(x_i - \mu_j)^T \hat{\Sigma}_j^{-1}(x_i - \mu_j)\right), \quad \text{Equation 25}$$

Pattern matching logic 512 may be configured to compare the features extracted by feature extraction logic 508 to the adapted version of speaker model 514 and generate measure of confidence 522 in accordance with Equation 25.

In accordance with certain embodiments, various approximations can be made to provide low-complexity variations of adapted covariance matrices. For example, an assumption can be made that the SNR estimates are constant per channel k. In accordance with such an embodiment, the SNR estimates, the adapted covariance matrix, the magnitude of the adapted covariance matrix, and the inverse of the adapted covariance matrix may be obtained in accordance with Equations 26, 27, 28 and 29, respectively, as shown below:

$$\xi_{k,i|j} = \xi_{i|j}^{o}, \quad \text{Equation 26}$$

$$\hat{\Sigma}_j = (1+\xi_{i|j}^{o,-1})\Sigma_j, \quad \text{Equation 27}$$

$$|\hat{\Sigma}_j| = (1+\xi_{k|j}^{o,-1})^D|\Sigma_j|, \quad \text{Equation 28}$$

$$\hat{\Sigma}_j^{-1} = (1+\xi_{k|j}^{o,-1})^{-1}\Sigma_j^{-1}, \quad \text{Equation 29}$$

In accordance with another embodiment, an assumption can be made that the SNR estimates are constant per channel k and per mixture j. In accordance with such an embodiment, measure of confidence 522 may be simplified to Equation 30, as shown below:

$$LLR(x) = \log\frac{p(x \mid H_T)}{p(x \mid H_N)} \approx \left(\frac{\xi_i}{1+\xi_i}\right)\left(\sum_i \log p(x_i \mid H_T) - \sum_i \log p(x_i \mid H_N)\right),$$

Equation 30

In addition to SID, other audio processing algorithms may benefit from filtered spectral features 518. As shown in FIG. 5, audio processing logic 506 is configured to receive filtered spectral features 518. Examples of filtered spectral features 518 that may be provided to audio processing logic 506 include, but are not limited to, warped-frequency spectral amplitudes (e.g., Mel-filtered spectra) and cepstra. Audio processing logic 506 may be configured to perform one or more audio processing algorithms (e.g., speech processing algorithm(s)) based on filtered spectral features 518. Examples of such audio processing algorithm(s) include, but are not limited to, voice activity detection and speech recognition.

Audio processing logic 506 may further be configured to receive measure of confidence 522. Audio processing algorithm(s) included in audio processing logic 506 may be configured to determine whether measure of confidence 522 exceeds a predefined threshold. In response to determining that measure of confidence 522 exceeds the predefined threshold, the audio processing algorithm(s) may enable an SID-assisted mode that causes the audio processing algorithm(s) to operate in a manner that takes into account the identity of the user that is speaking. Further details concerning SID-assisted audio processing algorithm(s) may be found in commonly-owned, co-pending U.S. patent application Ser. No. 13/965,661, entitled "Speaker-Identification-Assisted Speech Processing Systems and Methods" and filed on Aug. 13, 2013, U.S. patent application Ser. No. 14/041,464, entitled "Speaker-Identification-Assisted Downlink Speech Processing Systems and Methods" and filed on Sep. 30, 2013, and U.S. patent application Ser. No. 14/069,124, entitled "Speaker-Identification-Assisted Uplink Speech Processing Systems and Methods" and filed on Oct. 31, 2013, the entireties of which are incorporated by reference as if fully set forth herein.

Figure 6:
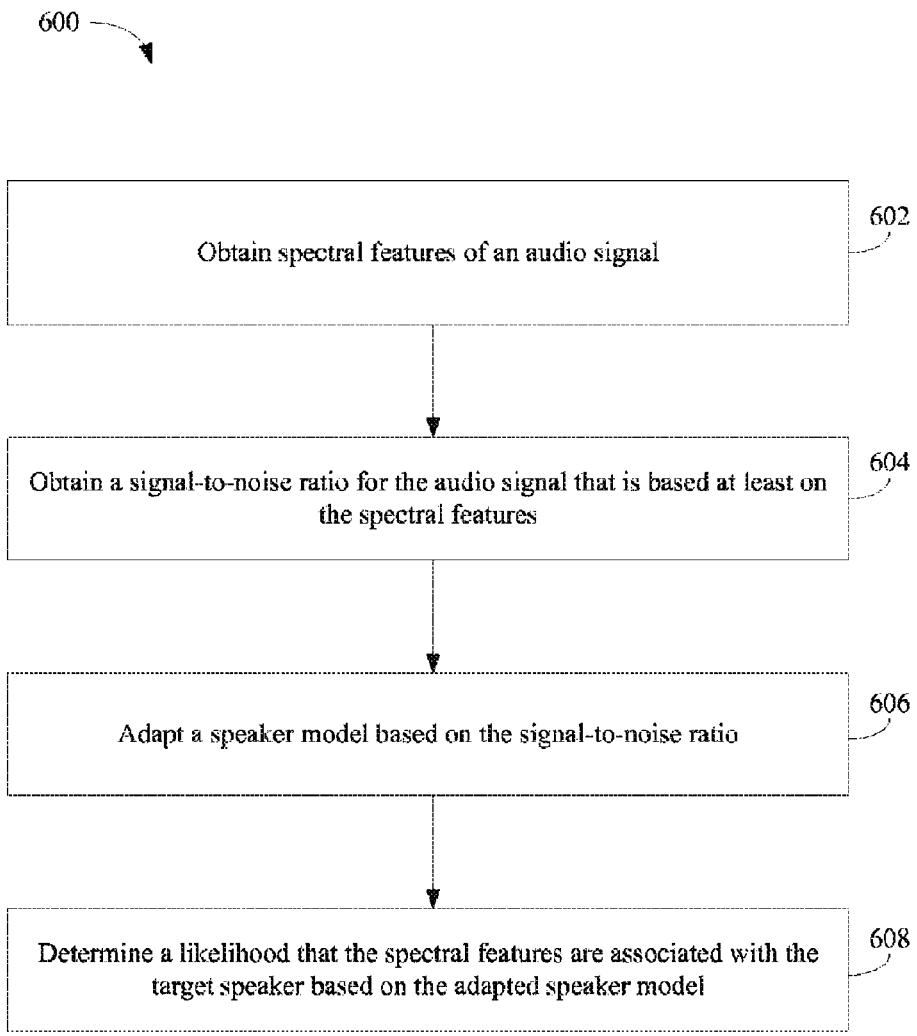
FIG. 6 depicts a flowchart of a method for performing speaker identification based on filtered spectral features in accordance with an embodiment.

Accordingly, in embodiments, system 500 may operate in various ways to perform SID and/or audio processing algorithms based on filtered spectral features 518. For example, FIG. 6 depicts a flowchart 600 of an example method for performing SID based on filtered spectral features 518 in accordance with an embodiment. The method of flowchart 600 will now be described with continued reference to system 500 of FIG. 5, although the method is not limited to that implementation. Other structural and operational embodiments will be apparent to persons skilled in the relevant art(s) based on the discussion regarding flowchart 600 and system 500.

As shown in FIG. 6, the method of flowchart 600 begins at step 602, in which spectral features of an audio signal are obtained. For example, with reference to FIG. 5, filtering logic 502 obtains spectral features 516 of an audio signal (e.g., audio signal 116).

In accordance with an embodiment, filtering logic 502 includes feature extraction logic (e.g., feature extraction logic 104) that obtains the spectral features by applying a short-time spectral analysis scheme, where short (e.g., 20-30 millisecond), overlapping windows are applied to an audio signal (e.g., audio signal 116), and each short window is converted to the frequency domain on a channel-by-channel basis using a short-time Fourier transform (STFT). Examples of spectral features that may be determined and used to perform SID include, but are not limited to, warped-frequency spectral amplitudes (e.g., Mel-filtered spectra) and cepstra.

At step 604, a signal-to-noise ratio (SNR) is obtained for the audio signal that is based at least on the spectral features. For example, as shown in FIG. 5, SNR estimator 520 obtains an SNR estimate for an audio signal (e.g., audio signal 116) based at least on spectral features 516.

In accordance with an embodiment, SNR estimator 520 obtains the SNR estimate based on spectral features 516 and a filtered version of spectral features (i.e., filtered spectral features 518). Filtered spectral features 518 may be provided by a filter that is based on a model of a modulation spectrum for a clean audio signal and a model of a modulation spectrum of the audio signal. For example, filtering logic 502 may include a filter (e.g., filter 114) that is based on a model of a modulation spectrum for a clean audio signal and a model of a modulation spectrum of an audio signal (e.g., audio signal 116). The models may be based on all-pole models of the modulation spectrum of the audio signal and the modulation spectrum of a clean audio signal.

At step 606, a speaker model is adapted based on the SNR. For example, as shown in FIG. 5, pattern matching logic 512 adapts speaker model 514 based on the SNR obtained by SNR estimator 520.

In accordance with an embodiment, the speaker model is adapted by adapting a covariance matrix associated with the speaker model based on the SNR. In accordance with such embodiment, the speaker model is represented by a GMM. The speaker model may be adapted by aligning the SNR to a particular mixture of the GMM to form a matrix of SNR estimates that contains an SNR estimate for each mixture. The matrix may then be used to adapt the covariance matrix associated with each mixture of the GMM.

At step 608, a likelihood that the audio signal is associated with the target speaker is determined based on the adapted speaker model. For example, as shown in FIG. 5, pattern matching logic 512 determines the likelihood (e.g., measure of confidence 522) that the audio signal (e.g., audio signal 116) is associated with the target speaker based on an adapted version of speaker model 514.

In accordance with an embodiment, pattern matching logic 512 determines measure of confidence 522 by comparing features extracted from filtered spectral features 518 by feature extraction logic 508 to the adapted version of speaker model 514.

Figure 7:
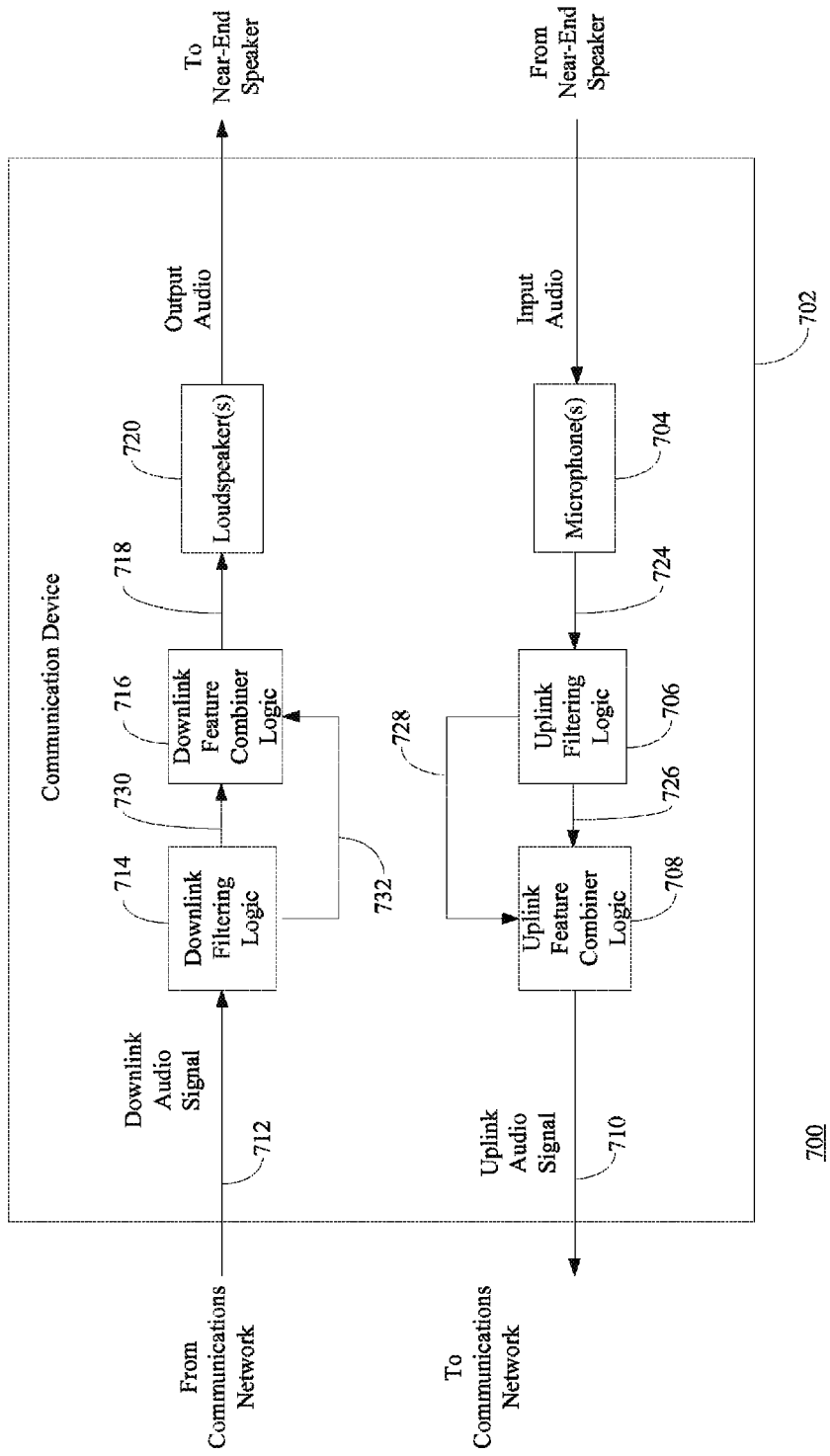
FIG. 7 is a block diagram of an implementation of a communication device that is configured to perform adaptive modulation filtering on an audio signal in accordance with an embodiment.

IV. Example System for Adaptive Modulation Filtering for Spectral Feature Enhancement in a Communication Device FIG. 7 is a block diagram of an implementation 700 of communication device 702 that is configured to perform adaptive modulation filtering on an audio signal in accordance with an embodiment. As shown in FIG. 7, communication device 702 includes one or more microphones 704, uplink filtering logic 706, uplink feature combiner logic 708, downlink filtering logic 714, downlink feature combiner logic 716 and one or more loudspeakers 720. Examples of communication device 702 may include, but are not limited to, a cell phone, a personal data assistant (PDA), a tablet computer, a laptop computer, a handheld computer, a desktop computer, a video game system, or any other suitable device capable of conducting a video call and/or an audio-only telephone call.

Microphone(s) 704 may be configured to capture input speech originating from a near-end speaker and to generate an input audio signal 724 based thereon. Uplink filtering logic 106 may comprise an implementation of filtering logic 102 as described above in reference to FIG. 1. Accordingly, uplink filtering logic 706 may be configured to obtain spectral features from input audio signal 724 and perform adaptive modulation filtering on the obtained spectral features to filter various forms of distortion from the obtained spectral features. The spectral features that may be obtained include, but are not limited to, linear spectral amplitudes (power, phase, magnitude amplitudes, etc.) and log-spectral amplitudes associated with input audio signal 724. The obtained spectral features that are filtered may include the magnitude amplitudes. In accordance with an embodiment, uplink filtering logic 706 may be configured to provide filtered magnitude amplitudes 726 and obtained phase 728 to uplink feature combiner logic 708 on a channel-by-channel basis.

Uplink feature combiner logic 708 may be configured to provide a new version of input audio signal 724 based on filtered magnitude amplitudes 726 and phase 728 that are received for each channel. The new version of input audio signal 724 may represent a filtered version of input audio signal 724. In accordance with an embodiment, uplink feature combiner logic 708 may obtain the new version of input audio signal 724 by first combining phase 728 with filtered magnitude amplitude 726. Next, an inverse Fast Fourier transform (IFFT) may be applied to the combined phase 728 and filtered magnitude amplitude 726 to obtain short-time audio waveforms that represent the combined phase 728 and filtered magnitude amplitude 726. Then, the short-time audio waveforms may be combined using an overlap-add technique to obtain the new version of input audio signal 724. The new version is provided as uplink audio signal 710.

Uplink audio signal 710 may be processed by one or more components that are configured to encode and/or convert uplink audio signal 710 into a form that is suitable for wired and/or wireless transmission across a communication network. Uplink audio signal 710 may be received by devices or systems associated with far-end speaker(s) via the communication network. Examples of communication networks include, but are not limited to, networks based on Code Division Multiple Access (CDMA), Time Division Multiple Access (TDMA), Frequency Division Multiple Access (FDMA), Frequency Division Duplex (FDD), Global System for Mobile Communications (GSM), Wideband-CDMA (W-CDMA), Time Division Synchronous CDMA (TD-SCDMA), Long-Term Evolution (LTE), Time-Division Duplex LTE (TDD-LTE) system, and/or the like.

Communication device 702 may also be configured to receive an audio signal (e.g., downlink audio signal 712) from the communication network. Downlink audio signal 712 may originate from devices or systems associated with far-end speaker(s). Downlink audio signal 712 may be processed by one or more components that are configured to convert and/or decode downlink audio signal 712 into a form that is suitable for processing by communication device 702.

Downlink filtering logic 714 may comprise an implementation of filtering logic 102 as described above in reference to FIG. 1. Accordingly, downlink filtering logic 714 may be configured to obtain spectral features from downlink audio signal 712 and perform adaptive modulation filtering on the obtained spectral features to filter various forms of distortion from the obtained spectral features. The spectral features that may be obtained include, but are not limited to, linear spectral amplitudes (power, phase, magnitude amplitudes, etc.) and log-spectral amplitudes associated with downlink audio signal 712. The obtained spectral features that are filtered may include the magnitude amplitudes. In accordance with an embodiment, downlink filtering logic 714 may be configured to provide filtered magnitude amplitudes 730 and obtained phase 732 to downlink feature combiner logic 716 on a channel-by-channel basis.

Downlink feature combiner logic 716 may be configured to provide a new version of downlink audio signal 712 based on filtered magnitude amplitudes 730 and phase 732 that are received for each channel. The new version of downlink audio signal 712 may represent a filtered version of downlink audio signal 712. In accordance with an embodiment, downlink feature combiner logic 714 may obtain the new version of downlink audio signal 712 by first combining phase 732 with filtered magnitude amplitude 730. Next, an IFFT may be applied to the combined phase 732 and filtered magnitude 730 to obtain short-time audio waveforms that represent the combined phase 732 and filtered magnitude 730. Then, the short-time audio waveforms may be combined using an overlap-add technique to obtain the new version of downlink audio signal 712. The new version is provided as filtered, downlink audio signal 718.

Loudspeaker(s) 720 may be configured to play back filtered, downlink audio signal 718 so that it may be perceived by one or more near-end users.

V. Other Embodiments

The adaptive modulation filtering techniques described herein can be easily combined with other noise robust techniques. For example, adaptive modulation filtering can serve as a spectral feature enhancement processing step in the feature extraction chain. It can also be used in series with other processing steps that enhance features and/or promote robustness. Such processing steps include but are not limited to spectral subtraction and log-spectral flooring, each of which are briefly described below.

When performing spectral subtraction, background noise of an audio signal may be estimated during periods of non-desired audio (i.e., periods when there is only (or mostly) background noise) on a frame-by-frame basis. This estimate is then subtracted from subsequent frames containing both the desired audio (e.g., speech, music, etc.) and the background noise to obtain an audio signal that does not contain the background noise. In accordance with an embodiment, feature extraction logic 104 (as shown in FIG. 1) and/or feature extraction logic 508 (as shown in FIG. 5) are configured to extract features from such an audio signal.

Log-spectral flooring may be used to emphasize discriminative information that can be used for SID. In the log-spectral domain, discriminative information is contained in high-energy peaks, and confusable (and noise-sensitive) information is contained in low-energy values. Log-spectral flooring may be applied to the filtered spectral features provided by a filter configured to perform adaptive modulation filtering (e.g., filter 114) such that the high-energy peaks are emphasized, thereby providing emphasized discriminative information to an SID process (e.g., performed by SID logic 504).

The adaptive modulation filtering techniques described herein are also compatible with common normalization techniques such as cepstral mean subtraction (CMS) or cepstral mean and variance normalization (CMVN). Since these techniques are also implemented as low-order IIR filters applied directly to log-spectral or cepstral features, these filters may be integrated into a filter configured to perform adaptive modulation filtering (e.g., filter 114). In this regard, Equations 31 and 32 describe a modulation filter implementation of CMS.

For example, Equation 31, as shown below, describes a noisy channel model:

$$\log Y_k(m) \approx \log(H_k(0)X_k(m) + D_k(m)) = \qquad \text{Equation 31}$$
$$\log X_k(m) + \log H_k(0) + \log\left(1 + \frac{D_k(m)}{H_k(0)X_k(m)}\right),$$

where $Y_k(m)$ is the noisy channel model, $H_k(0)$ is a first-order channel filter and $D_k(m)$ is the additive noise.

As is known in the art, CMS may be used to remove such additive noise by subtracting a mean feature vector that is computed over a certain period of time from the cepstra (i.e., the cepstra is normalized with respect to the local mean). This is shown below with respect to Equation 32:

$$\hat{c}_{X,k}(n) = c_{Y,k}(n) - E\{c_{Y,k}(n)\} \qquad \text{Equation 32}$$
$$\approx c_{Y,k}(n) - \underbrace{(1-\lambda)\sum_{l=0}^{\infty} \lambda^l c_{Y,k}(n-l)}_{\mu_{Y,k}(n)}$$
$$= \lambda c_{Y,k}(n) - \lambda \mu_{Y,k}(n-1),$$

where $C_{Y,k}(n)$ is the cepstra, $\hat{c}_{X,k}(n)$ is the normalized cepstra and $E\{c_{Y,k}(n)\}$ and $$(1-\lambda)\sum_{l=0}^{\infty} \lambda^l c_{Y,k}(n-l)$$

are representations of the mean feature vector $\mu_{Y,k}(n)$.

VI. Example Processor Implementation

Figure 8:
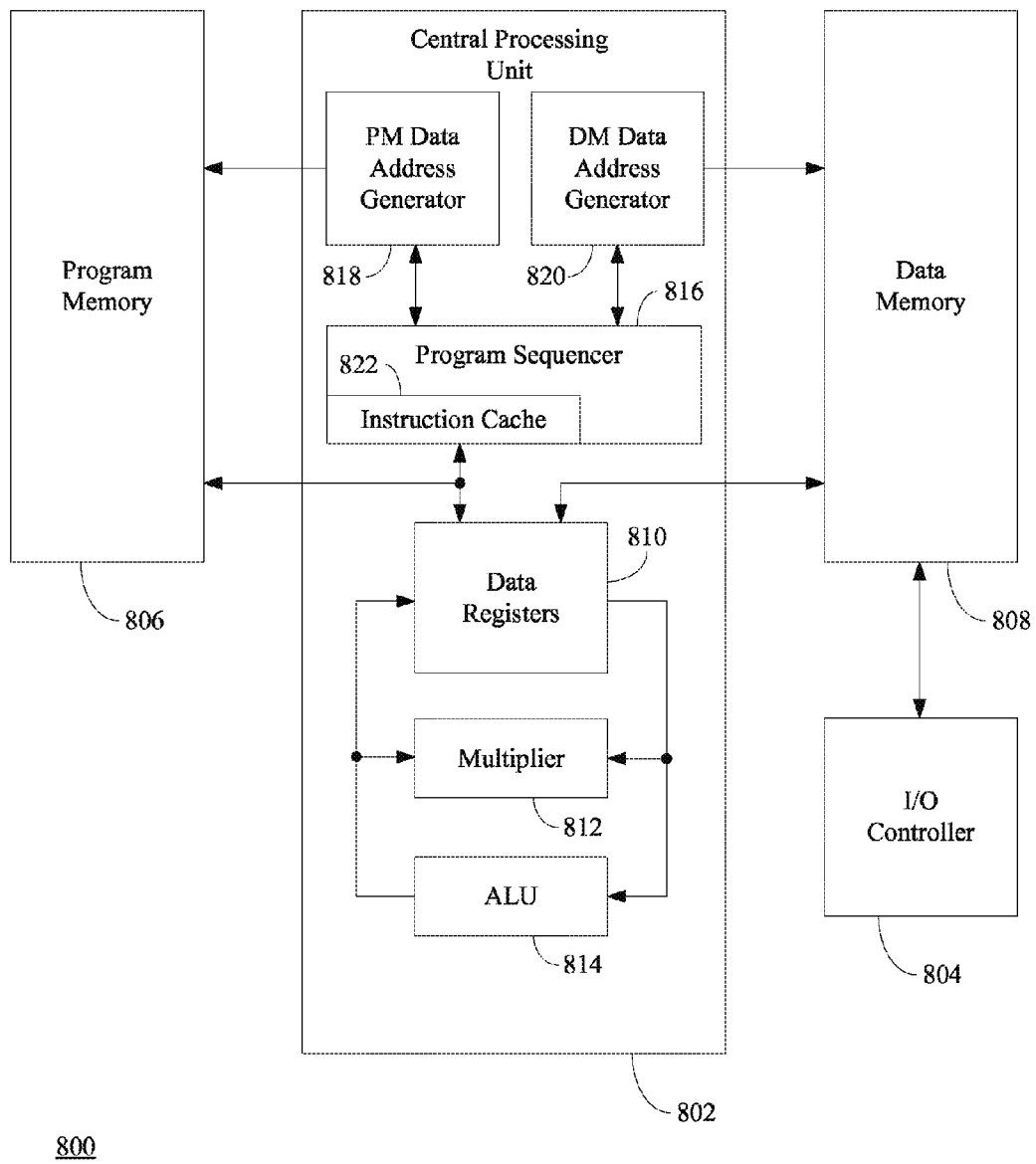
FIG. 8 depicts a block diagram of a processor that may be configured to perform techniques disclosed herein.

FIG. 8 depicts a block diagram of a processor 800 in which filtering logic 102 (and the elements described therein (e.g., feature extraction logic 104, autocorrelation coefficient calculation logic 106, parameter calculation logic 108 and/or filter 114)), as shown in FIG. 1, filtering logic 502, speaker identification logic 504 (and the elements described therein (e.g., feature extraction logic 508, training logic 510, pattern matching logic 512 and/or SNR estimator 520)) and/or audio processing logic 506, as shown in FIG. 5, and/or uplink filtering logic 706, uplink feature combiner logic 708, downlink filtering logic 714 and/or downlink feature combiner logic 716, as shown in FIG. 7, may be implemented. Processor 800 may include central processing unit (CPU) 802, an I/O controller 804, a program memory 806, and a data memory 808. CPU 802 may be configured to perform the main computation and data processing function of processor 800. I/O controller 804 may be configured to control communication to external devices via one or more serial ports and/or one or more link ports. For example, I/O controller 804 may be configured to provide data read from data memory 808 to one or more external devices and/or store data received from external device(s) into data memory 808. Program memory 806 may be configured to store program instructions used to process data. Data memory 808 may be configured to store the data to be processed.

Processor 800 further includes one or more data registers 810, a multiplier 812, and/or an arithmetic logic unit (ALU) 814. Data register(s) 810 may be configured to store data for intermediate calculations, prepare data to be processed by CPU 802, serve as a buffer for data transfer, hold flags for program control, etc. Multiplier 812 may be configured to receive data stored in data register(s) 810, multiply the data, and store the result into data register(s) 810 and/or data memory 808. ALU 814 may be configured to perform addition, subtraction, absolute value operations, logical operations (AND, OR, XOR, NOT, etc.), shifting operations, conversion between fixed and floating point formats, and/or the like.

CPU 802 further includes a program sequencer 816, a program memory (PM) data address generator 818, a data memory (DM) data address generator 820. Program sequencer 816 may be configured to manage program structure and program flow by generating an address of an instruction to be fetched from program memory 806. Program sequencer 816 may also be configured to fetch instruction(s) from instruction cache 822, which may store an N number of recently-executed instructions, where N is a positive integer. PM data address generator 818 may be configured to supply one or more addresses to program memory 806, which specify where the data is to be read from or written to in program memory 806. DM data address generator 820 may be configured to supply address(es) to data memory 808, which specify where the data is to be read from or written to in data memory 808.

VI. Further Example Embodiments

Techniques, including methods, described herein may be implemented by hardware (digital and/or analog) or a combination of hardware with software and/or firmware. Techniques described herein may be implemented by one or more components. Embodiments may comprise computer program products comprising logic (e.g., in the form of program code or software as well as firmware) stored on any computer useable medium, which may be integrated in or separate from other components. Such program code, when executed by one or more processors, causes a device to operate as described herein. Devices in which embodiments may be implemented may include storage, such as storage drives, memory devices, and further types of computer-readable storage media. Examples of such computer-readable storage media include, but are not limited to, a hard disk, a removable magnetic disk, a removable optical disk, flash memory cards, digital video disks, random access memories (RAMs), read only memories (ROM), and the like. In greater detail, examples of such computer-readable storage media include, but are not limited to, a hard disk associated with a hard disk drive, a removable magnetic disk, a removable optical disk (e.g., CDROMs, DVDs, etc.), zip disks, tapes, magnetic storage devices, MEMS (microelectromechanical systems) storage, nanotechnology-based storage devices, as well as other media such as flash memory cards, digital video discs, RAM devices, ROM devices, and the like. Such computer-readable storage media may, for example, store computer program logic, e.g., program modules, comprising computer executable instructions that, when executed, provide and/or maintain one or more aspects of functionality described herein with reference to the figures, as well as any and all components, steps and functions therein and/or further embodiments described herein.

Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as signals transmitted over wires. Embodiments are also directed to such communication media.

VII. Conclusion

While various embodiments have been described above, it should be understood that they have been presented by way of example only, and not limitation. It will be apparent to persons skilled in the relevant art that various changes in form and detail can be made therein without departing from the spirit and scope of the embodiments. Thus, the breadth and scope of the embodiments should not be limited by any of the above-described exemplary embodiments, but should be defined only in accordance with the following claims and their equivalents.

What is claimed is:

1. A method for identifying a target speaker, comprising:
   obtaining spectral features of an audio signal;
   obtaining a signal-to-noise ratio for the audio signal that is based at least on the spectral features;
   adapting a speaker model based on the signal-to-noise ratio; and
   determining a likelihood that the audio signal is associated with the target speaker based on the adapted speaker model.

2. The method of claim 1, wherein the signal-to-noise ratio is based on spectral features of the audio signal and a filtered version of the spectral features, and wherein the filtered version of the spectral features is provided by a filter that is based on a model of a modulation spectrum for a clean audio signal and a model of a modulation spectrum of the audio signal.

3. The method of claim 1, wherein adapting a speaker model based on the signal-to-noise estimate comprises:
   adapting a covariance matrix associated with the speaker model based on the signal-to-noise ratio.

4. The method of claim 3, wherein determining a likelihood that audio signal is associated with the target speaker based on the adapted speaker model comprises:
   determining the likelihood based on the adapted covariance matrix and an inverse of the adapted covariance matrix.

5. The method of claim 1, wherein said obtaining spectral features of the audio signal comprises:
   determining first spectral features of one or more first frames in a series of frames that represent the audio signal;
   obtaining one or more autocorrelation coefficients of a modulation envelope of the audio signal based on at least the first spectral features of the one or more first frames; and
   modifying parameters of an adaptive modulation filter used to filter spectral features of the audio signal based on the one or more autocorrelation coefficients, the filtered spectral features being the obtained spectral features.

6. The method of claim 5, wherein the adaptive modulation filter comprises one of an inverse filter and a Wiener filter.

7. The method of claim 1, wherein the spectral features comprise:
   linear spectral amplitudes;
   warped-frequency spectral amplitudes;
   log-spectral amplitudes; or
   cepstra.

8. A system for identifying a target speaker, comprising:
   filtering logic configured to obtain spectral features of an audio signal;
   an SNR estimator configured to obtain a signal-to-noise ratio for the audio signal that is based at least on the spectral features; and
   pattern matching logic configured to adapt a speaker model based on the signal-to-noise ratio,
   wherein the pattern matching logic is further configured to determine a likelihood that the audio signal is associated with the target speaker based on the adapted speaker model.

9. The system of claim 8, wherein the signal-to-noise ratio is based on spectral features of the audio signal and a filtered version of the spectral features, and wherein the filtered version of the spectral features is provided by a filter that is based on a model of a modulation spectrum for a clean audio signal and a model of a modulation spectrum of the audio signal.

10. The system of claim 8, wherein the pattern matching logic is configured to adapt the speaker model based on the signal-to-noise estimate by:
    adapting a covariance matrix associated with the speaker model based on the signal-to-noise ratio.

11. The system of claim 10, wherein the pattern matching logic is configured to determine the likelihood based on the adapted covariance matrix and an inverse of the adapted covariance matrix.

12. The system of claim 8, wherein the filtering logic is configured to obtain the spectral features of the audio signal by:
    determining first spectral features of one or more first frames in a series of frames that represent the audio signal;
    obtaining one or more autocorrelation coefficients of a modulation envelope of the audio signal based on at least the first spectral features of the one or more first frames; and
    modifying parameters of an adaptive modulation filter used to filter spectral features of the audio signal based on the one or more autocorrelation coefficients, the filtered spectral features being the obtained spectral features.

13. The system of claim 12, wherein the adaptive modulation filter comprises one of an inverse filter and a Wiener filter.

14. The system of claim 8, wherein the spectral features comprise:
    linear spectral amplitudes;
    warped-frequency spectral amplitudes;
    log-spectral amplitudes; or
    cepstra.

15. A non-transitory computer-readable storage medium having program instructions recorded thereon that, when executed by a processing device, perform a method for identifying a target speaker, the method comprising:
   obtaining spectral features of an audio signal;
   obtaining a signal-to-noise ratio for the audio signal that is based at least on the spectral features;
   adapting a speaker model based on the signal-to-noise ratio; and
   determining a likelihood that the audio signal is associated with the target speaker based on the adapted speaker model.

16. The non-transitory computer-readable storage medium of claim 15, wherein the signal-to-noise ratio is based on spectral features of the audio signal and a filtered version of the spectral features, and wherein the filtered version of the spectral features is provided by a filter that is based on a model of a modulation spectrum for a clean audio signal and a model of a modulation spectrum of the audio signal.

17. The non-transitory computer-readable storage medium of claim 15, wherein adapting a speaker model based on the signal-to-noise estimate comprises:
   adapting a covariance matrix associated with the speaker model based on the signal-to-noise ratio.

18. The non-transitory computer-readable storage medium of claim 17, wherein determining a likelihood that audio signal is associated with the target speaker based on the adapted speaker model comprises:
   determining the likelihood based on the adapted covariance matrix and an inverse of the adapted covariance matrix.

19. The non-transitory computer-readable storage medium of claim 15, wherein said obtaining spectral features of the audio signal comprises:
   determining first spectral features of one or more first frames in a series of frames that represent the audio signal;
   obtaining one or more autocorrelation coefficients of a modulation envelope of the audio signal based on at least the first spectral features of the one or more first frames; and
   modifying parameters of an adaptive modulation filter used to filter spectral features of the audio signal based on the one or more autocorrelation coefficients, the filtered spectral features being the obtained spectral features.

20. The non-transitory computer-readable storage medium of claim 15, wherein the adaptive modulation filter comprises one of an inverse filter and a Wiener filter.

* * * * *